United States Patent [19]

Finger

[11] 4,217,888
[45] Aug. 19, 1980

[54] LIQUID SOLAR HEAT COLLECTOR

[75] Inventor: John F. Finger, Beresford, S. Dak.

[73] Assignee: Sioux Steam Cleaner Corporation, Beresford, S. Dak.

[21] Appl. No.: 860,590

[22] Filed: Dec. 14, 1977

[51] Int. Cl.³ .............................. F24J 3/02; E06B 7/14
[52] U.S. Cl. ...................................... 126/450; 52/209; 49/408
[58] Field of Search ................. 126/270, 271; 52/208, 52/209, 827, 828; 49/408

[56] References Cited

U.S. PATENT DOCUMENTS

| Re. 17,370 | 7/1929 | Smith | 126/270 |
|---|---|---|---|
| 587,210 | 7/1897 | Jackson | 404/25 |
| 879,898 | 2/1908 | Plym | 52/209 |
| 1,703,230 | 2/1929 | Gillar | 52/209 |
| 2,425,060 | 8/1947 | Gildehaus | 52/209 |
| 2,885,945 | 5/1959 | Reaney | 49/92 |
| 4,099,513 | 7/1978 | Skrivseth | 126/270 |

FOREIGN PATENT DOCUMENTS 2730808  1/1978  Fed. Rep. of Germany ........... 126/271

Primary Examiner—Samuel Scott
Assistant Examiner—G. Anderson
Attorney, Agent, or Firm—Merchant, Gould, Smith, Edell, Welter & Schmidt

[57] ABSTRACT

A solar heat collector for use with a solar heating system, the solar heat collector being composed of a heat absorbing structure, a heat transmitting panel, a housing within which the heat absorbing structure is supported and further including a device for mounting the panel, and a conduit for trapping and conveying away liquid leaking past the panel.

5 Claims, 4 Drawing Figures

U.S. Patent
Aug. 19, 1980
4,217,888
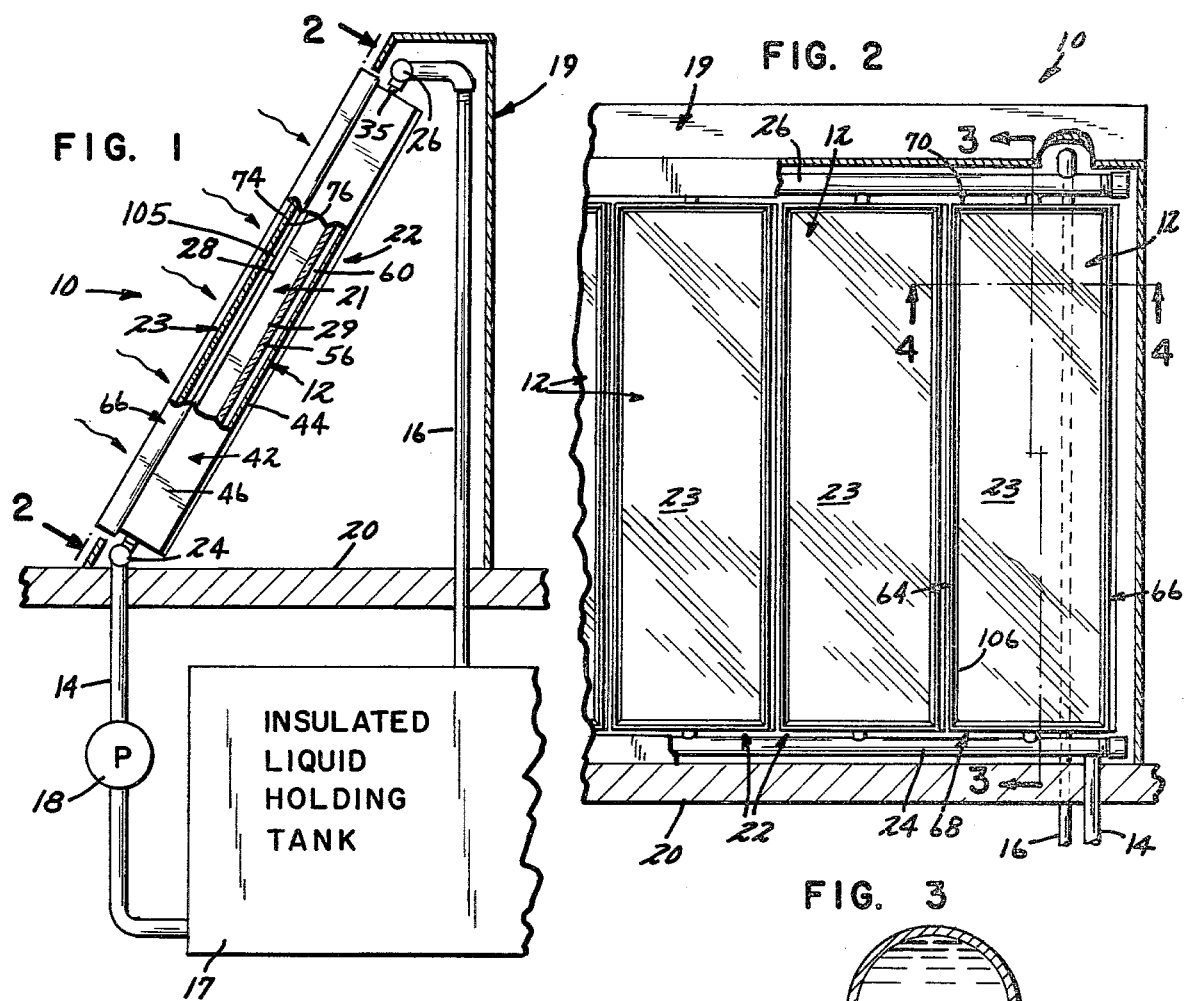
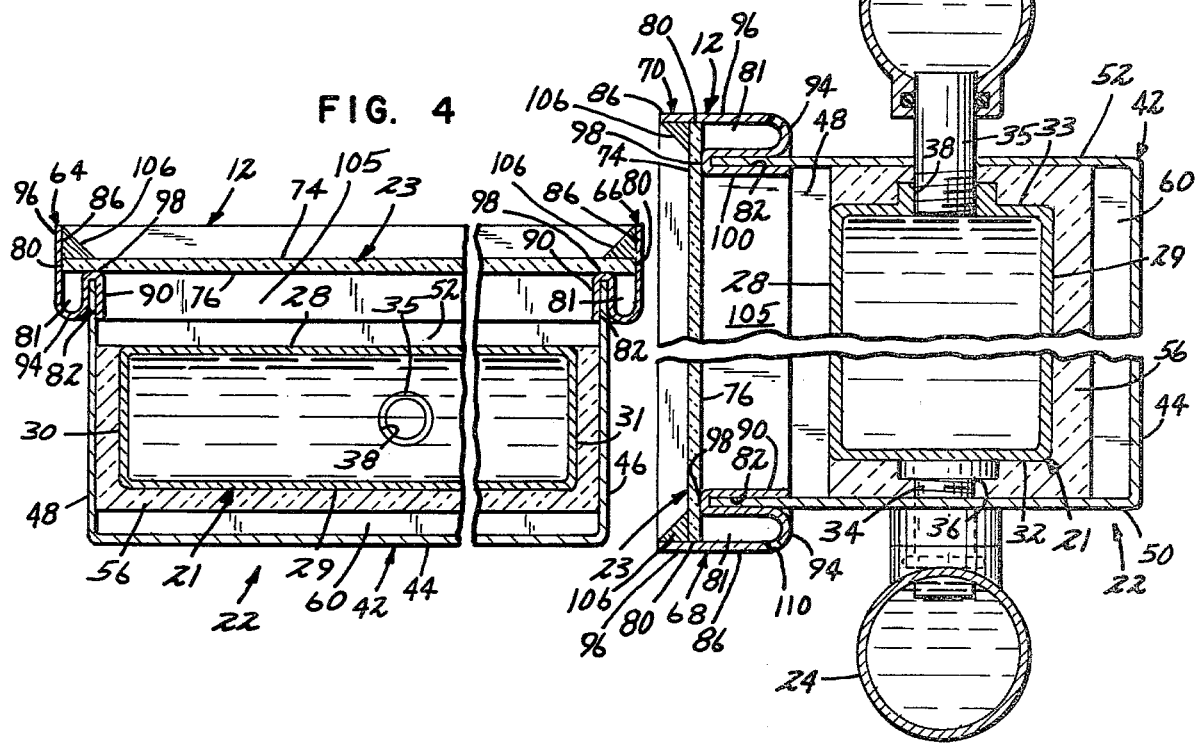

LIQUID SOLAR HEAT COLLECTOR

BACKGROUND OF THE INVENTION

This invention relates to solar heating systems, in particular a novel construction of a solar heat collector or collectors of such a system.

It is known in the art to provide closed solar heating systems through which a heat exchanging substance such as water or Freon circulates to heat homes or other buildings. An important part of a solar heating system is the solar heat collector. The solar collector usually comprises some form of heat absorbing structure such as a pipe or other container, a housing for supporting the heat absorbing structure, and a glass or plastic panel which is transparent with respect to the sun's rays and which is usually mounted in some manner on the housing. A few examples of such collectors may be found in the U.S. Pat. Nos. to Modine, 2,274,492; Frank, 3,875,926; Rowekamp, 3,277,883; and Estes et al, 3,916,871. Also, suitable insulating material may be disposed around the heat absorbing structure, such as plastic foam in the patent to Clark, 3,866,285, fiberglass in the patent to Edmundson, 3,952,725, or sand in the patent to Gaudo, 3,815,374.

As exemplified by the patents to Frank, supra, Estes et al, supra, and Rowekamp, U.S. Pat. No. 3,277,884, the heating system usually comprises a plurality of such solar collectors. Furthermore, these solar collectors are usually inclined at some suitable angle so that the heat absorbing structure will become heated by the sun's rays and transfer the heat to the heat exchanging substance which then goes to various parts of the home or building to be heated. Also the solar collectors are sometimes arranged so that the heat exchanging substance circulates through the heat absorbing structure due to convection as explained in the aforementioned patent to Modine.

A problem which can occur with these types of solar collectors is that moisture or some other liquid can leak past the edges of the heat transmitting panel and into the housing. Several undesirable effects can result from this leaked moisture or liquid. The leaked moisture or liquid can eventually collect in such quantities that it floods the solar collector. Also, during times of colder temperatures, the leaked moisture or liquid can freeze and possibly crack the heat transmitting panel, the housing or the heat absorbing structure. Furthermore, the frozen moisture or liquid can collect on the heat absorbing structure or on the heat transmitting panel, and depending on the reflective properties of the frozen moisture or liquid, reflect back the sun's rays thereby impairing the heat absorbing and transmitting function of the solar collector. Also, in the case of solar collectors such as the U.S. Pat. Nos. to Cutchaw, 3,923,038; Harris et al, 3,620,206; and Rowekamp, 3,886,998, where the heat exchanging substance is not within a totally enclosed heat absorbing structure, any leaked moisture or liquid can contaminate the heat exchanging substance depending on its composition. All of these undesirable effects require that the solar collector be dismantled for a periodic cleaning with all its inherent time, expense, and inconvenience.

In view of the foregoing problems, it is therefore important to be able to fabricate an inexpensive and easily manufactured device for trapping and conveying away moisture or liquid which leaks past the edges of the heat transmitting panel.

SUMMARY OF THE INVENTION

Applicant has invented a solar heat collector of novelty which forms part of a solar heating system. The solar heat collector is generally composed of a heat absorbing structure, a heat transmitting panel, a housing which includes a base frame within which the heat absorbing structure is supported and a means for mounting the panel on the base frame. A conduit, which is formed from portions of the mounting means and the panel, is provided for trapping and conveying away liquid leaking past the panel.

BRIEF DESCRIPTION OF THE DRAWING

FIG. 1 is a side view of the solar heat collector in elevation connected to the solar heating system with parts of the solar heat collector broken away and shown in section;

FIG. 2 is a sectional view taken along line 2—2 of FIG. 1 and shows a plurality of such solar heat collectors aligned in a substantially side-by-side relationship;

FIG. 3 is an enlarged sectional view taken along line 3—3 of FIG. 2 with the central portion of the solar collector broken away; and FIG. 4 is an enlarged sectional view taken along line 4—4 of FIG. 2, portions of the solar collector being broken away.

DETAILED DESCRIPTION OF THE PREFERRED EMBODIMENT

As shown in FIG. 1, a solar heat collector 12 forms part of a solar heating system generally designated as 10 which is filled with a heat exchanging substance, preferably water. The heating system 10 further includes an intake line 14, a return line 16, a holding tank 17 and a pump 18 for filling the system 10 with the heat exchanging substance. The solar collector 12 is held inclined at a suitable angle for receiving the sun's rays by a suitable support structure 19 which rests on the ground or some other structure 20. As shown in FIG. 2, the system 10 may comprise a plurality of solar collectors 12 in a substantially side-by-side relationship or in some other suitable configuration for receiving the sun's rays. Furthermore, several of the solar collectors 12 may be assembled together by banding them to a flat plate to unitize the number of sections that would provide the total required solar collection area. Also, the exterior of solar collectors 12 can be insulated with sheet insulation, plastic or other suitable material.

Where the system 10 is totally filled with the heat exchanging substance, the solar collector 12 may be arranged so that the heat exchanging substance circulates without aid of pump 18 due to convection. For instance, as shown in FIG. 1, the cooler heat exchanging substance in intake line 14 passes into the solar collector 12 where it is heated by the sun's rays, thereby rising to the top of the solar collector, and is taken out through return line 16 which then goes to holding tank 17 where the heat is stored. In addition, as arranged in FIG 1, the system 10 is self-draining when the pump 18 is shut down so that the heat exchanging substance will not freeze during periods of cold weather.

With reference to FIGS. 2-4, each solar collector 12 is preferably rectangular (e.g., three feet wide and ten feet in length) and generally comprises a heat absorbing structure such as tank 21 formed from a suitable heat absorbing material such as aluminum or steel, a housing generally designated as 22 within which the tank 21 is positioned and a heat transmitting panel 23 composed of a suitable glass or plastic material and which is mounted on the housing 22. Tank 21 is approximately ten feet in length and comprises generally a front wall 28, a back wall 29, short side walls 30, 31, a bottom wall 32 and a top wall 33.

Referring to FIG. 2, intake line 14 is connected to inlet header 24 while return line 16 is connected to outlet header 26. The inlet header 24 and the outlet header 26 are further connected to an inlet pipe 34 and an outlet pipe 35 respectively, the inlet and outlet pipes being approximately one-half inch in length. The inlet pipe 34 is further secured to an inlet port 36 formed in bottom wall 32 of tank 21 and outlet pipe 35 is further secured to an outlet port 38 formed in top wall 33 of tank 21 so that the heat exchanging substance can flow into and out of tank 21. As tank 21 becomes heated by the sunlight passing into solar collector 12, the heat exchanging substance within tank 21 is heated and circulates upward out of tank 21 due to convection resulting from the rise of heated heat exchanging substance.

Referring to FIG. 3, tank 21 is secured by suitable means within a base frame 42 which forms part of the housing 22. Base frame 42 is generally composed of a back wall 44, two side walls 46, 48, a bottom wall 50 and a top wall 52 to form a generally box-like structure. The bottom inlet pipe 34 extends through a hole in the bottom wall 50 while the top outlet pipe 35 extends through a hole in the top wall 52. A layer 56 of insulating material, preferably asbestos insulation paper, is disposed around all but the front wall 28 of tank 21 and abuts side walls 46, 48, bottom wall 50 and top wall 52 of base frame 42 for slightly greater than the length of side walls 30, 31, bottom wall 32 and top wall 33 respectively, of tank 21. The insulating material 56 is held secured about tank 21 by suitable means, not shown, such as steel banding. The disposition of the insulating material 56 between base frame 42 and tank 21 is such that a back air space 60 is defined by back wall 44, side walls 46, 48, bottom wall 50 and top wall 52 of base frame 42 and the layer of insulating material.

Referring to FIGS. 3-4, the housing 22 further includes a mounting structure composed of side mounting brackets 64, 66, a bottom mounting bracket 68 and a top mounting bracket 70 for supporting the heat transmitting panel 23. Panel 23 further comprises an outer face 74, an inner face 76 and edges 80.

Referring still to FIGS. 3-4, each mounting bracket is generally composed of a first component which forms a portion of a gutter or conduit generally designated as 81 and a channel 82 whose function and structure are hereinafter more fully described. Each of the mounting brackets has a generally S-shaped cross section composed of an outside loop 86 forming the first component and an inside loop 90 forming the second component. The outside loop 86 is further composed of a large bend 94 and a long leg 96 while the inside loop 90 is composed of a small bend 98 and a short leg 100. Leg 96 should be of sufficient length to extend past bend 98. A mounting bracket having an S-shaped cross section is preferred because it is easily manufactured and is unitized in strength. However, it should be understood that other shapes having similar features may also be utilized.

The inside loop 90 of each mounting bracket forms channel 82 which is sufficiently spaced to frictionally fit onto base frame 42 with the edges of frame 42 abutting the interior of small bend 98. The inner face 76 of panel 23 abuts the exterior or small bend 98 of each mounting bracket to define an interior interface while the edges 80 of the panel abut the long leg 96 of each mounting bracket so as to define an exteriorly exposed interface and a front air space 105. The outside loop 90 together with panel 23 form the conduit 81, the periphery of which has a generally U-shaped configuration.

Panel 23 is held in place by molding 106 formed from suitable material either in individual lengths or connected together to form a structure of the same shape and dimensions as the panel 23, the molding 106 being secured by suitable means known to the art to the mounting bracket and panel 23. In place of molding 106, putty material may also be used to secure panel 23 to the mounting brackets. The molding or putty also serves to help prevent seepage of moisture into the solar collector.

The mounting brackets are joined or formed together by suitable methods such as mitering the ends of each mounting bracket and welding them together depending upon the nature of the material used to form the mounting bracket. The interconnection of the mounting brackets results in conduit 82 forming a continuous enclosed structure with one or a plurality of drain holes or slots 110 being formed in bottom mounting bracket 68.

Although molding or putty 106 serves to prevent some seepage of moisture or liquid into the solar collector, some moisture or liquid will nonetheless leak past the exteriorly exposed interface between the edges 80 of panel 23 and the long leg 96 of each of the mounting brackets. The purpose of conduit 81 is to trap any of this leaked moisture or liquid and convey it away so that it may drain through drain hole 110, thereby preventing its collection in the housing or on the tank which would cause many problems hereinbefore enumerated.

From the foregoing description, it can be seen that Applicant has invented a solar collector having a novel device for trapping and conveying away moisture or other liquid leaking past the heat transmitting panel.

It should be understood that the above description indicates only a preferred embodiment and that changes may be made especially in matters of shape, size and arrangement of parts within the broad scope of the invention as defined by the language and terminology of the appended claims.

What is claimed is:

1. In a solar heat collector for use in a solar heating system, including:
   a heat absorbing structure;
   a heat transmitting panel;
   a housing within which the heat absorbing structure is supported, the housing including means for mounting the panel thereon in a spaced relation relative to the heat absorbing structure, the mounting means and the panel together defining an exteriorly exposed interface; and wherein the improvement relates to the panel mounting means which comprises:
   a plurality of mounting brackets each of which extend along and engage one side of the heat transmitting panel to support that side,
   wherein each mounting bracket is unitarily formed from one piece of material and has a cross-sectional configuration which defines two open ended loops that point in opposed direction, wherein one loop is sized to frictionally engage a portion of the housing to attach the bracket to the housing, wherein the other loop is located generally beneath an edge of the panel to form a moisture carrying conduit which conveys away any moisture which leaks past the exteriorly exposed interface, wherein the heat transmitting panel is supported along one side on an upwardly facing portion of said one loop of said mounting bracket on that side, wherein said mounting brackets are connected together at their ends such that the moisture carrying conduits communicate with one another and extend around the periphery of the heat transmitting panel, and further including at least one aperture located in one of the moisture carrying conduits such that said leaked fluid may drain by the force of gravity therefrom.

2. A solar collector according to claim 1 wherein said conduit of each mounting bracket has a generally U-shaped cross-section.

3. A solar collector according to claim 1 wherein said housing includes a base frame to support said mounting means and said base frame having a plurality of planar vertical edges which extend upwardly and on which said one loop of each of said mounting brackets is respectively frictionally engaged.

4. A solar collector according to claim 1, wherein each of said mounting brackets has a generally S-shaped cross-section to define said two loops.

5. A solar heat collector for use in a solar heating system, comprising:
 a heat absorbing tank having an inlet pipe and an outlet pipe;
 a heat transmitting panel;
 a base frame within which said tank is supported;
 a mounting structure to support said panel on said base frame spaced above said tank, said mounting structure comprising a plurality of unitary mounting brackets corresponding to the number of sides of the panel with each mounting bracket being located respectively along one side of said panel, each of said mounting brackets having a generally S-shaped cross-section which defines an outside loop and an inside loop, said outside loop having an outer leg engaging against an adjacent edge of one side of said panel and extending up above said panel so as to define an exteriorly exposed interface, said inside loop being sized to frictionally engage a portion of said base frame, said inside loop further having a portion which abuts against a face of said panel to support said panel thereon; and wherein a generally U-shaped conduit is formed by said outside loop located beneath the adjacent edges of said panel for trapping and conveying away liquid leaking past said exposed interface, and wherein said mounting brackets are interconnected at their ends, and said conduit includes at least one drain hole through which said leaked liquid may drain.

* * * * *